(12) United States Patent
Ahn et al.

(10) Patent No.: US 11,149,130 B2
(45) Date of Patent: Oct. 19, 2021

(54) METHOD OF PREPARING VINYL CHLORIDE-BASED POLYMER COMPOSITE, VINYL CHLORIDE-BASED POLYMER COMPOSITE, AND VINYL CHLORIDE-BASED POLYMER COMPOSITE COMPOSITION

(71) Applicant: LG CHEM, LTD., Seoul (KR)

(72) Inventors: Seong Yong Ahn, Daejeon (KR); Kun Ji Kim, Daejeon (KR); Se Woong Lee, Daejeon (KR); Hyun Kyou Ha, Daejeon (KR); Seong Jae Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 407 days.

(21) Appl. No.: 15/774,539

(22) PCT Filed: Sep. 5, 2017

(86) PCT No.: PCT/KR2017/009712
§ 371 (c)(1),
(2) Date: May 8, 2018

(87) PCT Pub. No.: WO2018/056610
PCT Pub. Date: Mar. 29, 2018

(65) Prior Publication Data
US 2020/0255626 A1    Aug. 13, 2020

(30) Foreign Application Priority Data
Sep. 26, 2016    (KR) ........................ 10-2016-0123386

(51) Int. Cl.
*C08K 5/526*    (2006.01)
*C08F 14/06*    (2006.01)

(52) U.S. Cl.
CPC .............. *C08K 5/526* (2013.01); *C08F 14/06* (2013.01)

(58) Field of Classification Search
CPC .................................. C08K 5/526; C08F 14/06
See application file for complete search history.

(56) References Cited

U.S. PATENT DOCUMENTS

| 4,163,838 A * | 8/1979 | Kalka ...................... C08J 3/122 |
| | | 528/501 |
| 9,315,596 B2 * | 4/2016 | Ahn ......................... C08F 2/001 |
| 10,696,760 B2 * | 6/2020 | Ahn ......................... C08F 2/001 |
| 2010/0190946 A1 | 7/2010 | Ahn et al. |
| 2016/0017126 A1 | 1/2016 | Mitamura et al. |

FOREIGN PATENT DOCUMENTS

| EP | 2 975 086 A1 * | 1/2016 |
| EP | 2975086 A1 | 1/2016 |
| EP | 3357942 A1 | 8/2018 |
| JP | 52-78985 A | 7/1977 |
| JP | 01-95114 A | 4/1989 |
| JP | 06-179714 A | 6/1994 |
| KR | 10-2007-0118441 A | 12/2007 |
| KR | 10-2012-0130801 A | 12/2012 |
| WO | 2007145416 A1 | 12/2007 |

OTHER PUBLICATIONS

Database WPI, Week 197733, Thomson Scientific, London, GB; AN 1977-58369Y, XP002784399, Jul. 2, 1977.

* cited by examiner

*Primary Examiner* — Robert D Harlan
(74) *Attorney, Agent, or Firm* — Dentons US LLP

(57) ABSTRACT

The present invention relates to a method of preparing a vinyl chloride-based polymer composite, which comprises dispersing a vinyl chloride-based monomer in water (Step 1); polymerizing the dispersed vinyl chloride-based monomer with an initiator to prepare a polymer slurry by (Step 2); and adding a phosphite to the polymer while drying the polymer slurry, to prepare a vinyl chloride-based polymer composite (Step 3), and a vinyl chloride-based polymer composite prepared by the method and a vinyl chloride-based polymer composite composition.

14 Claims, No Drawings

METHOD OF PREPARING VINYL CHLORIDE-BASED POLYMER COMPOSITE, VINYL CHLORIDE-BASED POLYMER COMPOSITE, AND VINYL CHLORIDE-BASED POLYMER COMPOSITE COMPOSITION

CROSS-REFERENCE TO RELATED APPLICATION

This application is a National Stage Application of International Application No. PCT/KR2017/009712 filed Sep. 5, 2017, and claims the benefit of Korean Patent Application No. 10-2016-0123386 filed Sep. 26, 2016, all of which are hereby incorporated by reference in their entirety for all purposes as if fully set forth herein.

TECHNICAL FIELD

The present invention relates to a method of preparing a vinyl chloride-based polymer composite, a vinyl chloride-based polymer composite, and a vinyl chloride-based polymer composite composition.

Background Art

A vinyl chloride-based polymer is a synthetic resin which is used the most among thermoplastic resins. A vinyl chloride-based monomer, which is a raw material used in the preparation of a vinyl chloride-based polymer, is polymerized in a batch reactor. In this case, an organic peroxide which is an explosive material is used as a reaction initiator, and a dispersant (emulsifying agent), an antioxidant, and the like are used as additives.

As a polymerization method of a vinyl chloride-based polymer, there are suspension polymerization, emulsion polymerization, and bulk polymerization. The suspension polymerization and emulsion polymerization are a method in which a vinyl chloride-based monomer is suspended (emulsified) in water and then reacted with an initiator, whereas the bulk polymerization is a method in which a vinyl chloride-based monomer is directly reacted with an initiator without use of water and a dispersant (emulsifying agent).

The suspension polymerization has advantages in that a conversion rate to a vinyl chloride-based polymer is high, an operating cost is low, a vinyl chloride-based monomer unreacted after a polymerization process is easily recovered, and maintenance is simple due to a small amount of scale accumulated in a reactor due to a coating system. Therefore, the suspension polymerization has significant advantages at present which is a mass production trend.

Meanwhile, a phosphite may serve as both an antioxidant and a thermal stabilizer. Therefore, when a phosphite is added in a preparation process of a vinyl chloride-based polymer, it is expected that a vinyl chloride-based polymer composite excellent in transparency and thermal stability can be prepared.

However, when coming in contact with water, a phosphite is hydrolyzed as shown in Reaction Schemes 1 to 3 below.

<Reaction Scheme 1>

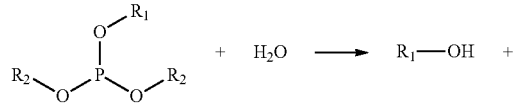

<Reaction Scheme 2>

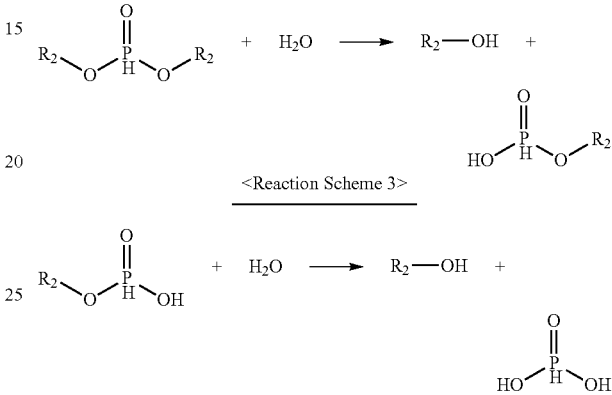

<Reaction Scheme 3>

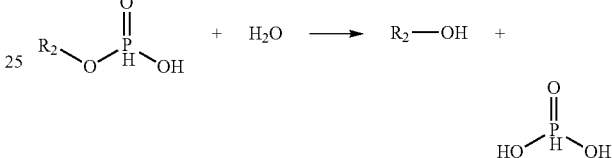

Accordingly, when a vinyl chloride-based polymer is prepared by suspension polymerization using water, it has been difficult to apply a phosphite so far despite excellent performance thereof.

DISCLOSURE

Technical Problem

It is an aspect of the present invention to provide a method of preparing a vinyl chloride-based polymer composite, which uses a phosphite that may serve as both an antioxidant and a thermal stabilizer although it is vulnerable to water.

In addition, it is another aspect of the present invention to provide a vinyl chloride-based polymer composite excellent in both transparency and thermal stability, and a vinyl chloride-based polymer composite composition.

Technical Solution

In order to accomplish the above objectives, according to an embodiment of the present invention, there is provided a method of preparing a vinyl chloride-based polymer composite, which comprises dispersing a vinyl chloride-based monomer in water (Step 1); polymerizing the dispersed vinyl chloride-based monomer with an initiator to prepare a polymer slurry (Step 2); and adding a phosphite to the polymer slurry while drying the polymer slurry is, to prepare a vinyl chloride-based polymer composite (Step 3).

In addition, according to another embodiment of the present invention, there is provided a vinyl chloride-based polymer composite which comprises a vinyl chloride-based polymer and a phosphite, wherein the phosphite is dispersed in a matrix of the vinyl chloride-based polymer.

In addition, according to still another embodiment of the present invention, there is provided a vinyl chloride-based polymer composite composition which comprises the above-described vinyl chloride-based polymer composite; and at least one selected from the group consisting of a stabilizer, a processing aid, an impact modifier, and a lubricant.

Advantageous Effects

A method of preparing a vinyl chloride-based polymer composite according to the present invention can minimize decomposition of a phosphite caused by water, that is, hydrolysis, by adding a phosphite in a drying process of a vinyl chloride-based polymer. Also, thermal damage to a vinyl chloride-based polymer which may occur in a drying process of a vinyl chloride-based polymer can be prevented. In addition, a vinyl chloride-based polymer composite prepared by the method of preparing a vinyl chloride-based polymer composite according to the present invention, and a vinyl chloride-based polymer composite composition comprising the same are excellent in both transparency and thermal stability.

MODE FOR INVENTION

Hereinafter, the present invention will be described in more detail for promoting an understanding of the present invention.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

In the present invention, a vinyl chloride-based polymer composite may refer to a composite in which a phosphite is dispersed in a matrix of a vinyl chloride-based polymer. Specifically, the vinyl chloride-based polymer composite may refer to a composite in which, although the vinyl chloride-based polymer and the phosphite are not chemically combined, the phosphite is uniformly dispersed and fixed in a matrix of the vinyl chloride-based polymer, that is, in a three-dimensional network structure, and two materials are integrated.

A method of preparing a vinyl chloride-based polymer composite according to an embodiment of the present invention may comprise dispersing a vinyl chloride-based monomer in water (Step 1).

In order to easily disperse the vinyl chloride-based monomer in water, a dispersant may be used.

The water may be deionized water or pure water.

The vinyl chloride-based monomer may be a pure vinyl chloride-based monomer or a mixed monomer comprising the pure vinyl chloride-based monomer as a main component and a vinyl-based monomer copolymerizable with the pure vinyl chloride-based monomer. The mixed monomer may include the vinyl-based monomer in an amount of 1 to 50 parts by weight with respect to 100 parts by weight of the vinyl chloride-based monomer. When the vinyl-based monomer is included within the above range, suspension polymerization is stably performed, and, further, processability of a vinyl chloride-based resin thus prepared is stabilized. The vinyl-based monomer may be at least one selected from the group consisting of an olefin compound such as ethylene, propylene, or the like; a vinyl ester such as vinyl acetate, vinyl propionate, or the like; an unsaturated nitrile such as acrylonitrile or the like; a vinyl alkyl ether such as vinyl methyl ether, vinyl ethyl ether, or the like; an unsaturated fatty acid such as acrylic acid, methacrylic acid, itaconic acid, maleic acid, or the like; and an anhydride of these fatty acids.

The dispersant may be at least one selected from the group consisting of water-soluble polyvinyl alcohol, partially saponified oil-soluble polyvinyl alcohol, polyacrylic acid, a copolymer of vinyl acetate and maleic anhydride, hydroxypropyl methylcellulose, gelatin, calcium phosphate, hydroxyapatite, sorbitan monolaurate, sorbitan trioleate, polyoxyethylene, sodium lauryl sulfate, sodium dodecylbenzene sulfonate, and sodium dioctyl sulfosuccinate.

The method of preparing a vinyl chloride-based polymer composite according to an embodiment of the present invention may comprise polymerizing the dispersed vinyl chloride-based monomer with an initiator to prepare a polymer slurry (Step 2).

In the step 2, the polymerization may be initiated and performed at a temperature of 50 to 65° C.

The initiator is an organic peroxide, and may be at least one selected from the group consisting of a diacyl peroxide such as dicumyl peroxide, dipentyl peroxide, di(3,5,5-trimethylhexanoyl) peroxide, dilauroyl peroxide, or the like; a peroxycarbonate such as diisopropyl peroxydicarbonate, di-sec-butyl peroxydicarbonate, di(2-ethylhexyl) peroxydicarbonate, or the like; a peroxyester such as t-butyl peroxy neodecanoate, t-butyl peroxy neoheptanoate, t-amyl peroxy neodecanoate, cumyl peroxy neodecanoate, cumyl peroxy neoheptanoate, 1,1,3,3-tetramethylbutyl peroxy neodecanoate, or the like; an azo compound such as azobis-2,4-dimethylvaleronitrile or the like; and a sulfate such as potassium persulfate, ammonium persulfate, or the like.

When a polymerization conversion rate reaches 80 to 90%, a reaction-terminating agent may be added to terminate the polymerization.

The reaction-terminating agent is a material which serves to terminate a reaction by causing the loss of function of the initiator, and may be at least one selected from the group consisting of a phenol compound, an amine compound, a nitrile compound, and a sulfur compound. The phenol compound may be at least one selected from the group consisting of triethylene glycol-bis-3-(3-t-butyl-4-hydroxy-5-methylphenyl)propionate, hydroquinone, p-methoxyphenol, t-butyl-4-hydroxyanisole, n-octadecyl-3-(4-hydroxy-3,5-di-t-butylphenyl)propionate, 2,5-di-t-butylhydroquinone, 4,4'-butylidene-bis(3-methyl-6-t-butyl phenol), t-butylcatechol, 4,4-thiobis(6-t-butyl-m-cresol), and tocopherol. The amine compound may be at least one selected from the group consisting of N,N-diphenyl-p-phenylenediamine and 4,4-bis(dimethylbenzyl)diphenyl. The nitrile compound may be at least one selected from the group consisting of 2-phenyl nitronyl nitroxide, 3-imidazoline nitroxide, and 4-hydroxy-2,2,6,6-tetramethyl-piperidine-1-oxyl. The sulfur compound may be one or more selected from the group consisting of dodecyl mercaptan and 1,2-biphenyl-2-thiol.

When the reaction-terminating agent is added, an additive such as an antioxidant and the like may be added as necessary. The antioxidant may be added for the purpose of making the color of a vinyl chloride-based polymer white.

The method of preparing a vinyl chloride-based polymer composite according to an embodiment of the present invention may further comprise stripping the polymer slurry and dehydrating the polymer slurry thus stripped after the step 2.

The stripping process is a process of separating an unreacted vinyl chloride-based monomer from the polymer slurry. The unreacted vinyl chloride-based monomer thus separated may be reused in the reaction.

The dehydration is a process of separating water from the polymer slurry thus stripped. In this case, water may be separated using a centrifuge.

The method of preparing a vinyl chloride-based polymer composite according to an embodiment of the present invention may comprise adding a phosphite to the polymer slurry while drying the polymer slurry, to prepare a vinyl chloride-based polymer (Step 3).

Since the phosphite may serve as both an antioxidant and a thermal stabilizer, a vinyl chloride-based polymer composite which is a final product may be excellent in both transparency and thermal stability. However, since the phosphite may be hydrolyzed when coming in contact with water, contact with water should be minimized. Accordingly, when the phosphite is added into the polymer slurry while the polymer slurry is dried, the phosphite is comprised in the vinyl chloride-based polymer while the hydrolysis of the phosphite is minimized, and thus inherent performance may be exhibited and thermal damage to a vinyl chloride-based polymer which may occur in the drying process may be prevented. When the phosphite is added in the polymerization, stripping process, or a dehydration process rather than the drying process of the method of preparing a vinyl chloride-based polymer composite, most of the phosphites are hydrolyzed by water, and thus the phosphite may not be comprised in a vinyl chloride-based polymer as is. Therefore, the phosphite may not serve as an antioxidant and a thermal stabilizer.

Specifically, in the step 3, a vinyl chloride-based polymer composite may be prepared by adding the phosphite to the polymer slurry while drying the polymer slurry when residual water content residual water content in the polymer slurry is 15 wt % to 25 wt % with respect to a total weight of the polymer slurry.

When the phosphite is added when residual water content is within the above range, a hydrolysis rate of the phosphite drops to 20% or less, and thus the phosphite may be added in the vinyl chloride-based polymer while the loss of the phosphite is minimized.

The drying in the step 3 may be performed using a fluid bed dryer which is fluidized by high-temperature air. The phosphite alone or in a state of a solution mixed with a solvent may be added in the polymer slurry by a spraying method in the fluid bed dryer. In this case, the phosphite may be added at a rate of 150 mg/s to 30,000 mg/s. When the phosphite is added at the above rate while the vinyl chloride-based polymer is dried, the phosphite may reach the inside of a matrix of the vinyl chloride-based polymer while a hydrolysis rate of the phosphite is minimized, and may also be fixed in a uniformly dispersed state in the matrix, that is, a three-dimensional network structure.

The phosphite may be a compound represented by Chemical Formula 1 below.

<Chemical Formula 1>

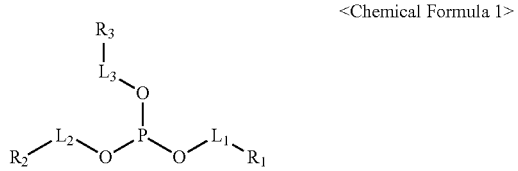

In Chemical Formula 1, $L_1$ to $L_3$ are the same or different from each other, and each independently, a C1 to C20 alkylene group or a C6 to C20 arylene group, or refer to a direct bonding between O and $R_1$ to $R_3$, respectively, and $R_1$ to $R_3$ are the same or different from each other, and each independently, a substituted or unsubstituted and linear or branched C1 to C20 alkyl group or a substituted or unsubstituted C6 to C20 aryl group.

Here, "direct bonding" means that O and $R_1$ to $R_3$ are directly connected without $L_1$ to $L_3$.

A phosphite represented by Chemical Formula 1 may be one or more selected from the group consisting of compounds listed in Table 1 below.

TABLE 1

| | Chemical Name | Structural Formula |
|---|---|---|
| 1 | Triethyl phosphite | (structural formula of triethyl phosphite) |
| 2 | Triisopropyl phosphite | (structural formula of triisopropyl phosphite) |

TABLE 1-continued

| | Chemical Name | Structural Formula |
|---|---|---|
| 3 | Triisodecyl phosphite | |
| 4 | Tridodecyl phosphite | |
| 5 | Phenyl diisodecyl phosphite | |
| 6 | Diphenyl isodecyl phosphite | |
| 7 | Triphenyl phosphite | |

TABLE 1-continued
| | Chemical Name | Structural Formula |
|---|---|---|
| 8 | Phenyl bis(4-nonylphenyl) phosphite | 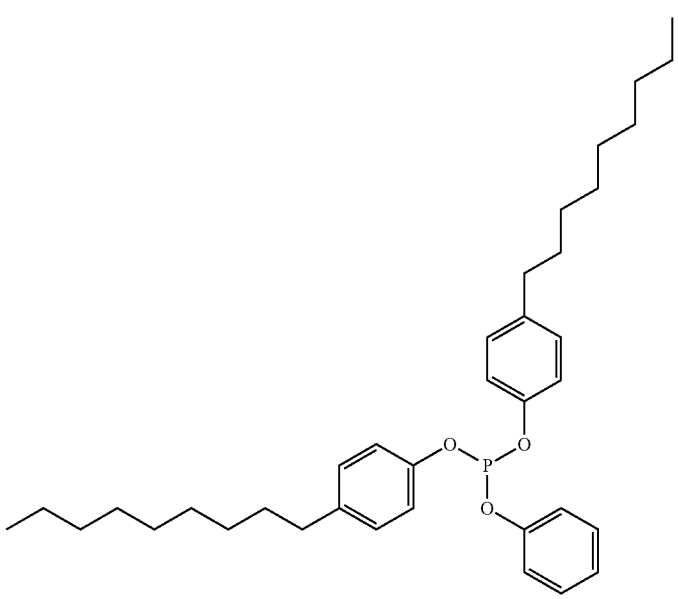 [SMILES: CCCCCCCCCc1ccc(OP(Oc2ccccc2)Oc2ccc(CCCCCCCCC)cc2)cc1] |
| 9 | Tris(4-octylphenyl) phosphite | 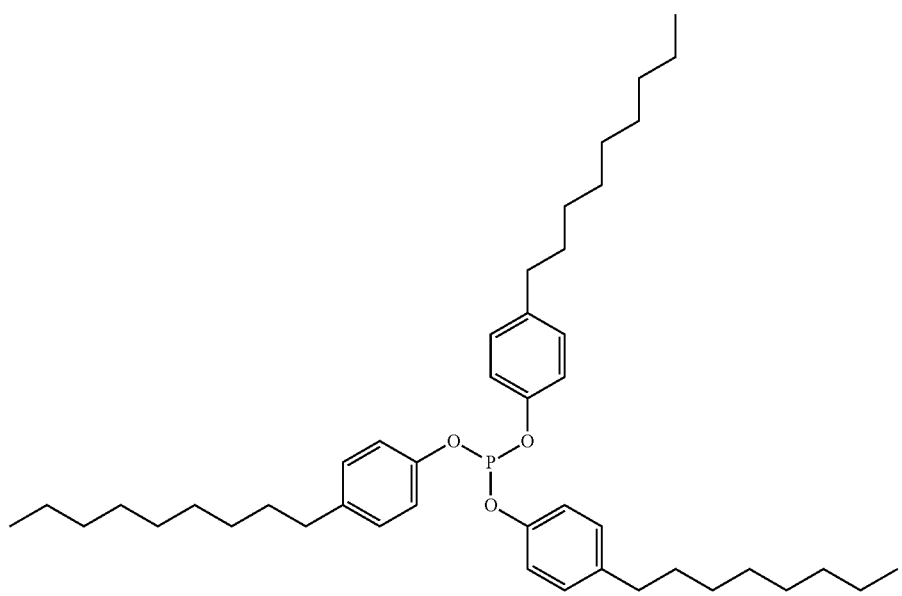 [SMILES: CCCCCCCCCc1ccc(OP(Oc2ccc(CCCCCCCC)cc2)Oc2ccc(CCCCCCCCC)cc2)cc1] |

TABLE 1-continued

| | Chemical Name | Structural Formula |
|---|---|---|
| 10 | Tris [(4-1-phenylethyl)phenyl] phosphite | |

The phosphite may be added in an amount of 0.001 to 1 part by weight, particularly 0.001 to 0.3 parts by weight, with respect to 100 parts by weight of the vinyl chloride-based monomer.

When the phosphite is added within the above range, hydrolysis of the phosphite may be minimized even when the phosphite is added in the drying process, and a vinyl chloride-based polymer excellent in both transparency and thermal stability may be prepared.

The phosphite may be added in a state of a solution mixed with a solvent. In this case, the contact of the phosphite and water is prevented as much as possible due to the solvent, and as a result, hydrolysis of the phosphite may be minimized. The phosphite also satisfies the above weight ratio in the solution, and may be included in an amount of 0.1 to 5 wt %, particularly 0.5 to 2 wt % with respect to the total weight of the solution. When the phosphite is added within the above range, hydrolysis of the phosphite may be minimized, and a vinyl chloride-based polymer excellent in both transparency and thermal stability may be prepared.

The solvent may be an alcohol solvent. The alcohol solvent may be at least one selected from the group consisting of methanol, ethanol, isopropanol, 1-methoxy propanol, butanol, ethyl hexyl alcohol, and terpineol.

A vinyl chloride-based polymer composite according to another embodiment of the present invention may be prepared by the method of preparing a vinyl chloride-based polymer composite according to an embodiment of the present invention. The vinyl chloride-based polymer composite may comprise a vinyl chloride-based polymer and a phosphite, wherein the phosphite may be dispersed in a matrix of the vinyl chloride-based polymer. Specifically, the phosphite may be uniformly dispersed and fixed in a matrix of the vinyl chloride-based polymer, that is, a three-dimensional network structure, and thus the phosphite may be uniformly distributed in the vinyl chloride-based polymer composite.

The phosphite may be included in an amount of 0.001 to 1.5 wt % with respect to the total weight of the vinyl chloride-based polymer composite.

When the phosphite is included within the above range, a vinyl chloride-based polymer composite excellent in both transparency and thermal stability may be provided without degradation of performance of a vinyl chloride-based polymer composite.

A vinyl chloride-based polymer composite composition according to still another embodiment of the present invention may include the vinyl chloride-based polymer composite and at least one selected from the group consisting of a stabilizer, a processing aid, an impact modifier, and a lubricant.

The stabilizer is a material which increases stability with respect to heat to prevent coloration and decomposition, and may be a metallic stabilizer or an organic acid metal salt stabilizer. The metallic stabilizer may be at least one selected from the group consisting of a lead-based stabilizer, a (organic) tin-based stabilizer, a cadmium-based stabilizer, and a barium-based stabilizer. The organic acid metal salt may be a carboxylic acid, organic phosphoric acid, or phenol metal salt. The carboxylic acid may be at least one selected from the group consisting of caproic acid, caprylic acid, pelargonic acid, 2-ethylhexyl acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, phenyl stearic acid, ricinoleic acid, linoleic acid, linolenic acid, oleic acid, arachic acid, behenic acid, erucic acid, brassidic acid, pseudo acids, resin fatty acids, coconut oil fatty acids, tung oil fatty acids, soybean oil fatty acids, cotton seed oil fatty acids, benzoic acid, p-t-butylbenzoic acid, ethylbenzoic acid, isopropylbenzoic acid, toluic acid, xylic acid, salicylic acid, 5-t-octylsalicylic acid, naphthenic acid, and cyclohexanecarboxylic acid. The organic phosphoric acid may be at least one selected from the group consisting of monooctyl phosphate, dioctyl phosphate, monododecyl phosphate, didodecyl phosphate, monooctadecyl phosphate, dioctadecyl phosphate, mono(nonylphenyl) phosphate, di(nonylphenyl) phosphate, phosphonic acid nonylphenyl ester, and phosphonic acid stearyl ester. The phenol may be at least one selected from the group consisting of phenol, cresol, ethylphenol, cyclohexylphenol, nonylphenol, and dodecylphenol. The metal salt may be a neutral salt, an acidic salt, a basic salt, or an overbased complex.

The processing aid is a material which promotes gelation of a vinyl chloride-based polymer composite, and may be a homopolymer or a copolymer of an alkyl methacrylate such as methyl methacrylate, ethyl methacrylate, butyl methacrylate, or the like; a copolymer of the alkyl methacrylate and an alkyl acrylate such as methyl acrylate, ethyl acrylate, butyl acrylate, or the like; a copolymer of the alkyl methacrylate and an aromatic vinyl compound such as styrene, α-methyl styrene, vinyltoluene, or the like; or a copolymer of the alkyl methacrylate and a vinyl cyanide compound such as acrylonitrile, methacrylonitrile, or the like. The processing aid may be used in combination of one or more thereof.

The impact modifier is a material which imparts elasticity to a vinyl chloride-based polymer composite to reinforce impact resistance, and may be at least one selected from the group consisting of a methyl methacrylate-butadiene styrene (MBS)-based polymer, a chlorinated polyethylene-based copolymer, an ethylene vinyl acetate-based polymer, an acrylic polymer, and a butadiene-based polymer.

The lubricant is a material which improves processability and interfacial properties of a vinyl chloride-based polymer composite, and may be a hydrocarbon-based lubricant such as low-molecular-weight wax, paraffin wax, polyethylene wax, a chlorinated hydrocarbon, fluorocarbon, or the like; a natural wax-based lubricant such as carnauba wax, candelilla wax, or the like; a fatty acid-based lubricant such as a higher fatty acid (e.g., lauric acid, stearic acid, behenic acid, or the like), an oxygenated fatty acid (e.g, hydroxystearic acid), or the like; an aliphatic amide-based lubricant such as an aliphatic amide compound (e.g, stearylamide, laurylamide, oleylamide, or the like), an alkylene bis aliphatic amide compound (e.g., methylene bis stearylamide and ethylene bis stearylamide) or the like; a alcohol ester-based lubricant of fatty acid such as a monohydric alcohol ester compound of fatty acids (e.g., stearyl stearate, butyl stearate, distearyl phthalate, or the like), a polyhydric alcohol ester compound of fatty acids (e.g., glycerin tristearate, sorbitan tristearate, pentaerythritol tetrastearate, dipentaerythritol hexastearate, polyglycerin polyricinoleate, hydrogenated castor oil, or the like), a composite ester compound of a monobasic fatty acid such as adipic acid stearic acid ester of dipentaerythritol, a polybasic organic acid, and polyhydric alcohol, or the like; an aliphatic alcohol-based lubricant such as stearyl alcohol, lauryl alcohol, palmityl alcohol, or the like; metal soap; a montanic acid-based lubricant such as partially saponified montanic acid ester or the like; an acrylic lubricant; or a silicone oil. The lubricant may be used alone or in combination of two or more.

BEST MODE

Hereinafter, preferred embodiments of the present invention will be described in order to aid in understanding the present invention. However, it is apparent to those skilled in the art that the description proposed herein is just a preferable example for the purpose of illustration only, and is not intended to limit or define the scope of the invention. Therefore, it should be understood that various changes and modifications can be made to the exemplary embodiments of the present invention without departing from the scope of the present invention, so that the present invention covers all such changes and modifications provided they are within the scope of the appended claims and their equivalents.

<Preparation of Vinyl Chloride-Based Polymer Composite>

Examples 1-1 to 1-5 and Comparative Examples 1-1 to 1-4

A polymerization device equipped with a 1 m$^3$ polymerization reactor, a reflux condenser which is connected to the polymerization reactor and controls a polymerization temperature, and a pipe for recovering vinyl chloride which is connected to the reflux condenser and releases an unreacted vinyl chloride-based monomer was used to polymerize a vinyl chloride-based monomer as follows.

First, 390 kg of deionized water was added in the polymerization reactor, and 150 g of polyvinyl alcohol (degree of hydration: 78.5%), 100 g of polyvinyl alcohol (degree of hydration: 40.7%), and 30 g of hydroxypropyl methylcellulose all together were added as a dispersant. Subsequently, 300 kg of a vinyl chloride-based monomer was added, and 30 g of di-(2-ethylhexyl)peroxydicarbonate and 120 g of t-butylperoxy neodecarbonate were added as an initiator. Polymerization was performed while an inner temperature of the polymerization reactor was maintained as shown in Table 2 below. When an inner pressure of the polymerization reactor reached 6.3 kg/cm$^2$, 15 g of 4-hydroxy-2,2,6,6-tetramethyl-piperidine-1-oxyl as a reaction-terminating agent, 60 g of triethylene glycol-bis-3-(3-t-butyl-4-hydroxy-5-methylphenyl)propionate as an antioxidant were sequentially added. Afterward, an unreacted monomer was recovered, and the polymerization was terminated, thereby obtaining a first polymer slurry. Subsequently, the first polymer slurry was recovered, and stripping and dehydrating processes were performed to separate an unreacted vinyl chloride-based monomer and water, thereby obtaining a second polymer slurry. While the second polymer slurry was hot-air dried in a fluid bed dryer at 60° C., when an amount of water remaining in the second polymer slurry was 20%, a phosphite solution listed in Table 2 below was added at a rate of 200 mg/s through a spraying method. Afterward, a vinyl chloride-based polymer composite in the form of powder was obtained through a screening facility.

TABLE 2

| Classification | Temperature (° C.) | Phosphite Type | Content in solution (wt %) | Amount of solution (kg) |
|---|---|---|---|---|
| Example 1-1 | 57 | Triphenyl phosphite | 1 | 0.6 |
| Example 1-2 | 57 | Tris(4-octylphenyl) phosphite | 1 | 3 |
| Example 1-3 | 57 | Phenyl bis(4-nonylphenyl) phosphite | 1 | 10 |
| Example 1-4 | 64 | Tridodecyl phosphite | 1 | 30 |
| Example 1-5 | 64 | Tris((4-1-phenylethyl) phenyl) phosphite | 1 | 100 |
| Comparative Example 1-1 | 57 | | | |
| Comparative Example 1-2 | 64 | | | |
| Comparative Example 1-3 | 57 | Triphenyl phosphite | 1 | 0.2 |
| Comparative Example 1-4 | 64 | Tris((4-1-phenylethyl) phenyl) phosphite | 1 | 100 |

Comparative Example 1-5

A polymerization device equipped with a 1 m³ polymerization reactor, a reflux condenser which is connected to the polymerization reactor and controls a polymerization temperature, and a pipe for recovering vinyl chloride which is connected to the reflux condenser and releases an unreacted vinyl chloride-based monomer was used to polymerize a vinyl chloride-based monomer as follows.

First, 390 kg of deionized water was added in the polymerization reactor, and 150 g of polyvinyl alcohol (degree of hydration: 78.5%), 100 g of polyvinyl alcohol (degree of hydration: 40.7%), and 30 g of hydroxypropyl methylcellulose all together were added as a dispersant. Subsequently, 300 kg of a vinyl chloride-based monomer was added, and 30 g of di-(2-ethylhexyl)peroxydicarbonate and 120 g of t-butylperoxy neodecarbonate were added as an initiator. Polymerization was performed while an inner temperature of the polymerization reactor was maintained at 57° C. When a polymerization rate reached 60%, 30 kg of a solution including 1 wt % triphenyl phosphite (solvent: ethanol) was injected using a pump. When an inner pressure of the polymerization reactor reached 6.3 kg/cm², 15 g of 4-hydroxy-2,2,6,6-tetramethyl-piperidine-1-oxyl as a reaction-terminating agent, 60 g of triethylene glycol-bis-3-(3-t-butyl-4-hydroxy-5-methylphenyl)propionate as an antioxidant were sequentially added. Afterward, an unreacted monomer was recovered, and the polymerization was terminated, thereby obtaining a first polymer slurry. Subsequently, the first polymer slurry was recovered, and stripping and dehydrating processes were performed to separate an unreacted vinyl chloride-based monomer and water, thereby obtaining a second polymer slurry. The second polymer slurry was hot-air dried in a fluid bed dryer at 60° C. to separate residual water. Afterward, a vinyl chloride-based polymer composite in the form of powder was obtained through a screening facility. A content of a phosphite in the vinyl chloride-based polymer composite thus obtained was measured, but measurement was not possible.

<Preparation of Sheet>

Examples 2-1 to 2-5 and Comparative Examples 2-1 to 2-6

100 parts by weight of a vinyl chloride-based polymer composite listed in Table 3 below, 1 part by weight of a mono/dimethyl tin mercaptide composite as a tin-based stabilizer, 1 part by weight of an acryl and methyl methacrylate (MMA) composite as a processing aid, 5 parts by weight of a methyl methacrylate (MMA) and butadiene composite as an impact modifier, 0.5 parts by weight of a fatty acid ester and wax composite as a lubricant, and an additive listed in Table 3 below were blended and mixed using a rolling mill at 185° C. for 3 minutes, thereby obtaining a preliminary sheet having a thickness of 0.5 mm. The preliminary sheet was cut, and then ten cut sheets were stacked one on top of the other and compressed all at once, thereby preparing a sheet having a thickness of 6 mm.

TABLE 3

| Classification | Vinyl chloride-based polymer composite | Additive Type | Content (parts by weight) |
|---|---|---|---|
| Example 2-1 | Example 1-1 | — | — |
| Example 2-2 | Example 1-2 | — | — |
| Example 2-3 | Example 1-3 | — | — |
| Example 2-4 | Example 1-4 | — | — |
| Example 2-5 | Example 1-5 | — | — |
| Comparative Example 2-1 | Comparative Example 1-1 | — | — |
| Comparative Example 2-2 | Comparative Example 1-2 | — | — |
| Comparative Example 2-3 | Comparative Example 1-3 | — | — |
| Comparative Example 2-4 | Comparative Example 1-4 | — | — |
| Comparative Example 2-5 | Comparative Example 1-5 | — | — |
| Comparative Example 2-6 | Example 1-1 | Triphenyl phosphite | 1 |

Examples 3-1 to 3-5 and Comparative Examples 3-1 to 3-6

100 parts by weight of a vinyl chloride-based polymer composite listed in Table 4 below, 4 parts by weight of a mono/dimethyl tin mercaptide composite as a tin-based stabilizer, 1 part by weight of an acryl and methyl methacrylate (MMA) composite as a processing aid, 6 parts by weight of a methyl methacrylate (MMA) and butadiene composite as an impact modifier, 0.5 parts by weight of a fatty acid ester and wax composite as a lubricant, and an additive listed in Table 4 below were blended and mixed using a rolling mill at 185° C. for 3 minutes, thereby obtaining a preliminary sheet having a thickness of 0.5 mm. The preliminary sheet was cut, and ten cut sheets were stacked one on top of the other, put into a frame having a thickness of 3 mm, and compressed all at once. Then, the compressed sheets were preheated at 185° C. for 2 minutes, heated at 185° C. for 3 minutes under a pressure of 10 kg/cm2, and cooled at 185° C. for 2 minutes under a pressure of 15 kg/cm², thereby preparing a sheet having a thickness of 3 mm.

TABLE 4

| Classification | Vinyl chloride-based polymer composite | Additive Type | Content (parts by weight) |
|---|---|---|---|
| Example 3-1 | Example 1-1 | — | — |
| Example 3-2 | Example 1-2 | — | — |
| Example 3-3 | Example 1-3 | — | — |
| Example 3-4 | Example 1-4 | — | — |
| Example 3-5 | Example 1-5 | — | — |
| Comparative Example 3-1 | Comparative Example 1-1 | — | — |
| Comparative Example 3-2 | Comparative Example 1-2 | — | — |
| Comparative Example 3-3 | Comparative Example 1-3 | — | — |
| Comparative Example 3-4 | Comparative Example 1-4 | — | — |
| Comparative Example 3-5 | Comparative Example 1-5 | — | — |
| Comparative Example 3-6 | Example 1-1 | Triphenyl phosphite | 1 |

Experimental Example 1

<Measurement of Haze Rate and Transmission Rate>

The haze rate and transmission rate of each of the sheets according to Examples 2-1 to 2-5 and Comparative Examples 2-1 to 2-6 were measured using Haze-gard plus commercially available from BYK-Gardner GmbH, results of which are shown in Table 5 below.

Haze rate: defined as percentage of light that passes through a sample with respect to initially radiated beam (as a larger amount of light passes through a sample, the haze rate is lower, which means better transparency)

Transmission rate: inversely proportional to haze rate

TABLE 5

| Classification | Haze rate (%) | Transmission rate (%) |
|---|---|---|
| Example 2-1 | 8.8 | 81.7 |
| Example 2-2 | 7.9 | 83.6 |
| Example 2-3 | 7.3 | 84.3 |
| Example 2-4 | 6.9 | 85.8 |
| Example 2-5 | 6.6 | 86.5 |
| Comparative Example 2-1 | 10.5 | 76.5 |
| Comparative Example 2-2 | 10.7 | 76.3 |
| Comparative Example 2-3 | 9.8 | 78.9 |
| Comparative Example 2-4 | Unmeasurable | Unmeasurable |
| Comparative Example 2-5 | 10.6 | 76.4 |
| Comparative Example 2-6 | 9.2 | 81.0 |

Referring to Table 5, it can be seen that the sheets according to Examples 2-1 to 2-5 had a haze rate of 6.6% to 8.8% and a transmission rate of 81.7% to 86.5%, indicating excellent transparency. On the other hand, it can be seen that the sheets according to Comparative Examples 2-1 to 2-3 had a haze rate of 9.8% to 10.7% and a transmission rate of 76.3% to 78.9%, indicating transparency lower than that of the sheets according to Examples 2-1 to 2-5. In the sheet according to Comparative Example 2-4, a resin was agglomerated to form an agglomeration, and thus a haze rate and a transmission rate could not be measured. The sheet according to Comparative Example 2-5 had a haze rate and a transmission rate similar to those of the sheets according to Comparative Examples 2-1 and 2-2 not including a phosphite. It was considered to be due to the fact that all phosphites included in a polymerization process were hydrolyzed, and thus an effect of a phosphite could not be realized. Also, it can be seen that the sheet according to Comparative Example 2-6 exhibited a haze rate and a transmission rate lower than those of the sheets according to Examples 2-1 to 2-5. It can be seen that the sheet according to Comparative Example 2-6 exhibited a decrease in transparency because, although a content of a phosphite in the sheet was within the same range as in the vinyl chloride-based polymer composite of the present invention, a phosphite is not dispersed in a matrix of a vinyl chloride-based polymer.

Experimental Example 2

<Evaluation and Measurement of Thermal Stability>

In order to evaluate thermal stability of each of the sheets according to Examples 3-1 to 3-5 and Comparative Examples 3-1 to 3-5, a whiteness index (W.I) was measured using NR-3000 commercially available from Nippon Denshoku Industries Co., Ltd., results of which are shown in Table 6 below. Generally, thermal stability can be evaluated from a whiteness index, and a higher whiteness index indicates excellent thermal stability.

TABLE 6

| Classification | Whiteness index |
|---|---|
| Example 3-1 | 33.1 |
| Example 3-2 | 35.6 |
| Example 3-3 | 38.5 |
| Example 3-4 | 42.5 |
| Example 3-5 | 43.8 |
| Comparative Example 3-1 | 28.2 |
| Comparative Example 3-2 | 26.4 |
| Comparative Example 3-3 | 30.0 |
| Comparative Example 3-4 | Unmeasurable |
| Comparative Example 3-5 | 28.0 |
| Comparative Example 3-6 | 32.0 |

Referring to Table 6, it can be seen that the sheets according to Examples 3-1 to 3-5 had a whiteness index of 33.1 to 43.8, indicating excellent thermal stability. On the other hand, it can be seen that the sheets according to Comparative Examples 3-1 to 3-3 had a whiteness index of 26.4 to 30.0, indicating thermal stability lower than that of the sheets according to Examples 3-1 to 3-5. Also, in the sheet according to Comparative Example 3-4, a resin was agglomerated to form an agglomeration, and thus a whiteness index could not be measured. The sheet according to Comparative Example 3-5 had a similar whiteness index to those of the sheets according to Comparative Examples 3-1 and 3-2 not including a phosphite. It was considered to be due to the fact that all phosphites included in a polymerization process were hydrolyzed, and thus an effect of a phosphite could not be realized. Also, it can be seen that the sheet according to Comparative Example 3-6 exhibited a whiteness index lower than those of the sheets according to Examples 3-1 to 3-5. It can be seen that the sheet according to Comparative Example 3-6 exhibited a decrease in thermal stability because, although a content of a phosphite in the sheet was within the same range as in the vinyl chloride-based polymer composite of the present invention, a phosphite is not dispersed in a matrix of a vinyl chloride-based polymer.

The invention claimed is:

1. A method of preparing a vinyl chloride-based polymer composite, comprising:
   dispersing a vinyl chloride-based monomer in water (Step 1);
   polymerizing the dispersed vinyl chloride-based monomer in the presence of an initiator to prepare a polymer slurry of a vinyl chloride-based polymer (Step 2); and
   adding a phosphite to the polymer slurry while drying the polymer slurry, to prepare a vinyl chloride-based polymer composite (Step 3).

2. The method of claim 1, wherein the polymerization is suspension polymerization.

3. The method of claim 1, further comprising stripping and dehydrating the polymer slurry after the step 2.

4. The method of claim 1, wherein, in the step 3, the phosphite is added when residual water content in the polymer slurry is 15 wt % to 25 wt % with respect to a total weight of the polymer slurry while drying the polymer slurry, to prepare the vinyl chloride-based polymer composite.

5. The method of claim 1, wherein, in the step 3, the phosphite is added by a spraying method while drying the polymer slurry, to prepare the vinyl chloride-based polymer composite.

6. The method of claim 1, wherein the phosphite is added in a state of a solution mixed with an alcohol solvent.

7. The method of claim 1, wherein the phosphite is a compound of Formula 1 below:

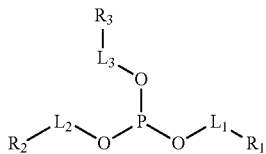
<Formula 1> wherein $L_1$ to $L_3$ are the same or different from each other, and each independently, a C1 to C20 alkylene group or a C6 to C20 arylene group, or refer to a direct bonding between O and $R_1$ to $R_3$, respectively, and $R_1$ to $R_3$ are the same or different from each other, and each independently a substituted or unsubstituted and linear or branched C1 to C20 alkyl group or a substituted or unsubstituted C6 to C20 aryl group.

8. The method of claim 7, wherein the phosphite is one or more selected from the group consisting of triethyl phosphite, triisopropyl phosphite, triisodecyl phosphite, tridodecyl phosphite, phenyl diisodecyl phosphite, diphenyl isodecyl phosphite, triphenyl phosphite, phenyl bis(4-nonylphenyl) phosphite, tris(4-octylphenyl) phosphite, and tris((4-1-phenylethyl)phenyl) phosphite.

9. The method of claim 1, wherein the phosphite is added in an amount of 0.001 to 1 part by weight with respect to 100 parts by weight of the vinyl chloride-based monomer.

10. A vinyl chloride-based polymer composite prepared by the method according to claim 1, comprising the vinyl chloride-based polymer and the phosphite,
wherein the phosphite is dispersed in a matrix of the vinyl chloride-based polymer.

11. The vinyl chloride-based polymer composite of claim 10, wherein the phosphite is present in an amount of 0.001 to 1.5 wt % with respect to a total weight of the vinyl chloride-based polymer composite.

12. A vinyl chloride-based polymer composite composition, comprising:
the vinyl chloride-based polymer composite of claim 10; and
at least one material selected from the group consisting of a stabilizer, a processing aid, an impact modifier, and a lubricant.

13. The method of claim 1, wherein the phosphite is dispersed in a matrix of the vinyl chloride-based polymer in the vinyl chloride-based polymer composite.

14. The method of claim 13, wherein the phosphite is dispersed and fixed in a three-dimensional network structure of the vinyl chloride-based polymer in the vinyl chloride-based polymer composite.

* * * * *